United States Patent
Xu et al.

(10) Patent No.: US 9,109,128 B2
(45) Date of Patent: Aug. 18, 2015

(54) INK COMPOSITIONS

(75) Inventors: Jinqi Xu, Westford, MA (US); Paul S. Palumbo, West Newton, MA (US)

(73) Assignee: Cabot Corporation, Boston, MA (US)

( * ) Notice: Subject to any disclaimer, the term of this patent is extended or adjusted under 35 U.S.C. 154(b) by 160 days.

(21) Appl. No.: 13/880,164

(22) PCT Filed: Oct. 20, 2011

(86) PCT No.: PCT/US2011/056985
§ 371 (c)(1),
(2), (4) Date: Apr. 18, 2013

(87) PCT Pub. No.: WO2012/054664
PCT Pub. Date: Apr. 26, 2012

(65) Prior Publication Data
US 2013/0210999 A1    Aug. 15, 2013

Related U.S. Application Data

(60) Provisional application No. 61/405,796, filed on Oct. 22, 2010.

(51) Int. Cl.
| | |
|---|---|
| C08G 18/08 | (2006.01) |
| C08G 18/28 | (2006.01) |
| C08G 18/70 | (2006.01) |
| C08K 3/20 | (2006.01) |
| C08L 75/00 | (2006.01) |
| C09D 11/30 | (2014.01) |
| C08G 18/38 | (2006.01) |
| C09D 5/02 | (2006.01) |
| C08J 3/20 | (2006.01) |
| C09D 11/00 | (2014.01) |
| C08J 5/00 | (2006.01) |
| C09D 5/00 | (2006.01) |
| C09D 11/324 | (2014.01) |
| C08J 3/03 | (2006.01) |
| C09D 175/00 | (2006.01) |
| C09D 11/36 | (2014.01) |
| C08J 3/09 | (2006.01) |
| C08G 18/00 | (2006.01) |
| C08G 18/66 | (2006.01) |
| C08G 18/65 | (2006.01) |
| C08J 3/00 | (2006.01) |
| C08L 75/04 | (2006.01) |
| C08G 18/48 | (2006.01) |
| C08G 18/82 | (2006.01) |
| C09D 7/00 | (2006.01) |
| C09D 175/04 | (2006.01) |
| C08K 5/00 | (2006.01) |

(Continued)

(52) U.S. Cl.
CPC ............... *C09D 11/30* (2013.01); *C08G 18/00* (2013.01); *C08G 18/0819* (2013.01); *C08G 18/0823* (2013.01); *C08G 18/0828* (2013.01); *C08G 18/388* (2013.01); *C08G 18/3878* (2013.01); *C08G 18/44* (2013.01); *C08G 18/48* (2013.01); *C08G 18/65* (2013.01); *C08G 18/66* (2013.01); *C08G 18/6659* (2013.01); *C08G 18/6692* (2013.01); *C08G 18/7621* (2013.01); *C08G 18/82* (2013.01); *C08J 3/00* (2013.01); *C08J 3/03* (2013.01); *C08J 3/09* (2013.01); *C08J 3/20* (2013.01); *C08J 5/00* (2013.01); *C08K 5/0041* (2013.01); *C08L 75/00* (2013.01); *C08L 75/04* (2013.01); *C09D 5/00* (2013.01); *C09D 5/022* (2013.01); *C09D 5/028* (2013.01); *C09D 7/007* (2013.01); *C09D 11/00* (2013.01); *C09D 11/102* (2013.01); *C09D 11/322* (2013.01); *C09D 11/324* (2013.01); *C09D 11/326* (2013.01); *C09D 11/36* (2013.01); *C09D 175/00* (2013.01); *C09D 175/04* (2013.01)

(58) Field of Classification Search
CPC ............... C08G 18/00; C08G 18/0819; C08G 18/0823; C08G 18/0828; C08G 18/3878; C08G 18/388; C08G 18/48; C08G 18/65; C08G 18/66; C08G 18/82; C08G 18/12; C08G 18/44; C08G 18/6659; C08G 18/6692; C08G 18/7621; C08J 3/00; C08J 3/20; C08J 3/03; C08J 3/09; C08J 2375/00; C08J 2375/04; C08K 3/00; C08K 3/0033; C08K 3/04; C08K 3/20; C08K 5/00; C08K 5/0041; C08L 75/00; C08L 75/04; C09D 5/00; C09D 5/022; C09D 5/028; C09D 7/007; C09D 11/00; C09D 11/30; C09D 11/322; C09D 11/324; C09D 11/36; C09D 175/00; C09D 175/04; C09D 11/102; C09D 11/326
USPC ............ 524/589, 590, 591, 839, 840; 528/72
See application file for complete search history.

(56) References Cited

U.S. PATENT DOCUMENTS 5,661,207 A    8/1997  Carlson et al.
6,210,473 B1   4/2001  Boils et al.
(Continued)

FOREIGN PATENT DOCUMENTS

WO    WO 2012/009415 A2    1/2012

OTHER PUBLICATIONS

International Preliminary Report on Patentability for PCT International Application No. PCT/US2011/056985, date of issuance of report Apr. 23, 2013.
(Continued)

*Primary Examiner* — Patrick Niland

(57) ABSTRACT

Polyurethanes containing at least one bisphosphonate group, as well as related compositions, articles, and methods, are disclosed.

24 Claims, No Drawings

(51) Int. Cl.
*C09D 11/102* (2014.01)
*C09D 11/322* (2014.01)
*C09D 11/326* (2014.01)
*C08G 18/76* (2006.01)
*C08G 18/44* (2006.01)

(56) References Cited

U.S. PATENT DOCUMENTS 6,320,011 B1 * 11/2001 Levy et al. .................. 528/72

2002/0123599 A1  9/2002  Levy et al.
2007/0100023 A1  5/2007  Burns et al.
2007/0100024 A1  5/2007  Gu et al.
2009/0229489 A1  9/2009  Gu

OTHER PUBLICATIONS

Written Opinion of the International Searching Authority for PCT International Application No. PCT/US2011/056985, mailed on Jun. 22, 2012.

* cited by examiner

INK COMPOSITIONS

CROSS-REFERENCE TO RELATED APPLICATIONS

This application is a national phase application under 35 U.S.C. §371 of International Application Number PCT/US2011/056985, filed on Oct. 20, 2011, which claims priority to U.S. Provisional Patent Application No. 61/405,796, filed on Oct. 22, 2010, the disclosure of which is incorporated herein by reference.

TECHNICAL FIELD

This disclosure relates to polyurethanes containing at least one bisphosphonate group, as well as related compositions, articles, and methods.

BACKGROUND

Ink compositions generally contain water soluble dyes or water-insoluble pigments. Although some dye-based inks are suitable for their intended purposes, dyes have several disadvantages when used in inkjet ink compositions. For example, water-soluble dyes may dissolve and run when exposed to moisture or water. Dye images may further smear or rub off on contact with felt pen markers or upon being rubbed or touched by finger. Dyes may also exhibit poor light stability when exposed to visible light, ultraviolet light, or sunlight. Pigments can also be used as colorants in ink compositions to overcome some of the disadvantages of the dyes.

SUMMARY

The inventors have realized that certain polymers (e.g., polyurethanes) containing at least one bisphosphonate group can be used as an additive or dispersant in an ink composition (e.g., an inkjet ink composition) to improve the jetting of the composition. In addition, images generated from such an ink composition can have improved optical density and/or improved durability (e.g., with little or no trail in a highlight smear test).

In one aspect, this disclosure features a polyurethane including a first comonomer repeat unit that contains a hydrophilic group. The polyurethane further includes a functional group different from the hydrophilic group. The functional group contains $(CH_2)_nC(R)(PO_3H_2)_2$ or an ester or salt thereof, in which n is 0-9 and R is H, $R_a$, $OR_a$, $SR_a$, or $NR_aR_b$, each of $R_a$ and $R_b$, independently, being H, $C_1$-$C_{10}$ alkyl, or aryl.

In another aspect, this disclosure features a polyurethane containing a functional group as an end group of the polyurethane. The functional group includes $(CH_2)_nC(R)(PO_3H_2)_2$ or an ester or salt thereof, in which n is 0-9 and R is H, $R_a$, $OR_a$, $SR_a$, or $NR_aR_b$, in which each of $R_a$ and $R_b$, independently, is H, $C_1$-$C_{10}$ alkyl, or aryl.

In another aspect, this disclosure features a polyurethane that includes a comonomer repeat unit of formula (IV) or (V):

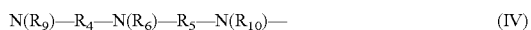

(IV)

or

(V)

in which each of $R_4$ and $R_5$, independently, is a bond, $C_1$-$C_{10}$ alkylene, $C_3$-$C_{20}$ cycloalkylene, $C_3$-$C_{20}$ heterocycloalkylene, arylene, or heteroarylene, each of which being optionally substituted with $C_1$-$C_{10}$ alkyl or aryl, provided that at least one of $R_4$ and $R_5$ is not a bond; $R_6$ is $(CH_2)_nC(R)(PO_3H_2)_2$ or an ester or salt thereof, in which n is 0-9 and R is H, $R_a$, $OR_a$, $SR_a$, or $NR_aR_b$, each of $R_a$ and $R_b$, independently, being H, $C_1$-$C_{10}$ alkyl, or aryl; each of $R_7$ and $R_8$, independently, is H, $R_c$, $OR_c$, $SR_c$, $NR_cR_d$, $PO_3H_2$ or an ester or salt thereof, or $(CH_2)_mC(R')(PO_3H_2)_2$ or an ester or salt thereof, in which m is 0-9 and R' is H, $R_c$, $OR_c$, $SR_c$, or $NR_cR_d$, each of $R_c$ and $R_d$, independently, being H, $C_1$-$C_{10}$ alkyl, or aryl, provided that, if neither of $R_7$ and $R_8$ is $(CH_2)_mC(R')(PO_3H_2)_2$ or an ester or salt thereof, both of $R_7$ and $R_8$ are $PO_3H_2$ or an ester or salt thereof; and each of $R_9$ and $R_{10}$, independently, is H, $C_1$-$C_{10}$ alkyl, or aryl.

As used herein, the term "alkyl" refers to a saturated, linear or branched, non-cyclic hydrocarbon moiety, such as —$CH_3$ or —$CH(CH_3)_2$. The term "alkylene" refers to a divalent alkyl. The term "cycloalkyl" refers to a saturated, cyclic hydrocarbon moiety, such as cyclohexyl. The term "cycloalkylene" refers to a divalent cycloalkyl. The term "heterocycloalkyl" refers to a saturated, cyclic moiety having at least one ring heteroatom (e.g., N, O, or S), such as 4-tetrahydropyranyl. The term "heterocycloalkylene" refers to a divalent heterocycloalkyl. The term "aryl" refers to a hydrocarbon moiety having one or more aromatic rings. Examples of aryl moieties include phenyl (Ph), naphthyl, pyrenyl, anthryl, and phenanthryl. The term "arylene" refers to a divalent aryl (e.g., phenylene or naphthylene). The term "heteroaryl" refers to a moiety having one or more aromatic rings that contain at least one heteroatom (e.g., N, O, or S). Examples of heteroaryl moieties include furyl, furylene, fluorenyl, pyrrolyl, thienyl, oxazolyl, imidazolyl, thiazolyl, pyridyl, pyrimidinyl, quinazolinyl, quinolyl, isoquinolyl and indolyl. The term "heteroarylene" refers to a divalent heteroaryl.

In still another aspect, this disclosure features a composition (e.g., an ink composition) containing one or more of the polyurethanes described above and a liquid vehicle.

Other features and advantages will be apparent from the description and the claims.

DETAILED DESCRIPTION

This disclosure generally relates to compositions (e.g., ink compositions) containing a polyurethane having at least one bisphosphonate group. The composition can have improved jetting property and can generate images with improved optical density and durability (e.g., with little or no trail in a highlight smear test).

As used herein, the term "polyurethane" refers to a polymer containing organic moieties joined by urethane (e.g., —NH—C(O)—O—) linkages. In some embodiments, the polyurethane described herein can also include other types of linkages, such as urea linkages (e.g., —NH—C(O)—NH—), in addition to the urethane linkages. Such polymers are still referred to as polyurethanes in this disclosure.

In some embodiments, the polyurethane includes at least a first comonomer repeat unit that contains one or more hydrophilic groups. As used herein, the term "hydrophilic group" refers to a group capable of forming hydrogen bonding with water. Exemplary hydrophilic group include a hydroxyl group, a carboxylic acid group, a sulfonic acid group, a phosphonic acid group, a polyether group (e.g., a polyethylene glycol group), and a salt thereof. The hydrophilic group can be either ionic (e.g., a carboxylic acid group) or non-ionic (e.g., a hydroxyl group).

The polyurethane can further include a functional group (e.g., a moiety containing a bisphosphonate group) different from the hydrophilic group. As used herein, the term "bisphosphonate group" refers to any moiety containing two phosphonic acid groups (i.e., $PO(OH)_2$) or an ester or salt thereof. In some embodiments, a bisphosphonate group can be a moiety containing two phosphonic acid groups (i.e., $PO(OH)_2$) or an ester or salt thereof on the same carbon atom. The functional group can be located on the first comonomer repeat unit or on a comonomer repeat unit different from the first comonomer repeat unit. Examples of comonomer repeat units containing the functional group include comonomer repeat units of formulae (VI) and (V) described below. In such embodiments, the functional group is typically located in the middle of the polymer chain of the polyurethane.

In some embodiments, the functional group can be an end group of the polyurethane. In such embodiments, the functional group can be located either at only one end of the polyurethane or at both ends of the polyurethane.

In some embodiments, the functional group can include $(CH_2)_nC(R)(PO_3H_2)_2$ or an ester or salt thereof, in which n is 0-9 (i.e., 0, 1, 2, 3, 4, 5, 6, 7, 8, and 9) and R is H, $R_a$, $OR_a$, $SR_a$, or $NR_aR_b$, each of $R_a$ and $R_b$, independently, being H, $C_1$-$C_{10}$ alkyl, or aryl. As used herein, the term "an ester or salt of $(CH_2)_nC(R)(PO_3H_2)_2$" includes both a partial ester or salt (i.e., not more than three of the OH groups in $(CH_2)_nC(R)(PO_3H_2)_2$ have been converted to an ester or salt) and a complete ester or salt (i.e., all four OH groups in $(CH_2)_nC(R)(PO_3H_2)_2$ have been converted to an ester or salt). In some embodiments, the functional group can include $(CH_2)_3C(OH)(PO_3H_2)_2$ or a partial ester or salt thereof.

When the functional group is a salt of $(CH_2)_nC(R)(PO_3H_2)_2$, the salt can include an anion formed from $(CH_2)_nC(R)(PO_3H_2)_2$ (e.g., $(CH_2)_3C(OH)(PO_3H_2)(PO(OH)(O^-))$) and any suitable cation. Exemplary cations include $Li^+$, $Na^+$, $K^+$, $Cs^+$, and $N(R_c)_4^+$, in which $R_c$ can be H, $C_1$-$C_{10}$ alkyl, or aryl. For example, the functional group can be a partial salt containing $K^+$ and an anion formed from $(CH_2)_nC(R)(PO_3H_2)_2$, such as $(CH_2)_3C(OH)(PO_3H_2)(PO(OH)(OK))$ or $(CH_2)_3C(OH)(PO(OH)(OK))(PO(OH)(OK))$. When a salt molecule contains two or three cations (e.g., $K^+$ cations), the cations can form ionic bonds with any two or three of the four OH groups in the functional group.

When the functional group is an end group of the polyurethane, the functional group can be introduced to the polyurethane by reacting the polyurethane or its prepolymer with an end-capping reagent. Examples of suitable end-capping reagents include those of the formula $NH_2(CH_2)_nC(R)(PO_3H_2)_2$, in which n is 0-9 (i.e., 0, 1, 2, 3, 4, 5, 6, 7, 8, and 9) and R is H, $R_a$, $OR_a$, $SR_a$, or $NR_aR_b$, each of $R_a$ and $R_b$, independently, being H, $C_1$-$C_{10}$ alkyl, or aryl. An exemplary end-capping reagent is

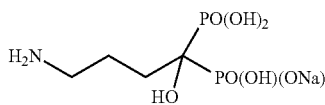

(i.e., sodium alendronate).

In some embodiments, the functional group can be located in the middle of the polymer chain of the polyurethane. In such embodiments, the functional group can be located in a comonomer repeat unit. Examples of such comonomer repeat units include comonomer repeat units of formulae (IV) and (V):

  (IV)

or

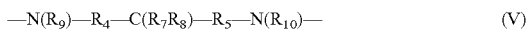  (V)

in which each of $R_4$ and $R_5$, independently, is a bond, $C_1$-$C_{10}$ alkylene, $C_3$-$C_{20}$ cycloalkylene, $C_3$-$C_{20}$ heterocycloalkylene, arylene, or heteroarylene, each of which being optionally substituted with $C_1$-$C_{10}$ alkyl or aryl, provided that at least one of $R_4$ and $R_5$ is not a bond; $R_6$ is $(CH_2)_nC(R)(PO_3H_2)_2$ or an ester or salt thereof, in which n is 0-9 and R is H, $R_a$, $OR_a$, $SR_a$, or $NR_aR_b$, each of $R_a$ and $R_b$, independently, being H, $C_1$-$C_{10}$ alkyl, or aryl; each of $R_7$ and $R_8$, independently, is H, $R_c$, $OR_c$, $SR_c$, $NR_cR_d$, $PO_3H_2$ or an ester or salt thereof, or $(CH_2)_mC(R')(PO_3H_2)_2$ or an ester or salt thereof, in which m is 0-9 and R' is H, $R_c$, $OR_c$, $SR_c$, or $NR_cR_d$, each of $R_c$ and $R_d$, independently, being H, $C_1$-$C_{10}$ alkyl, or aryl, provided that, if neither of $R_7$ and $R_8$ is $(CH_2)_mC(R')(PO_3H_2)_2$ or an ester or salt thereof, both of $R_7$ and $R_8$ are $PO_3H_2$ or an ester or salt thereof; and each of $R_9$ and $R_{10}$, independently, is H, $C_1$-$C_{10}$ alkyl, or aryl. In formula (V), when both of $R_7$ and $R_8$ are $PO_3H_2$ or an ester or salt thereof, $C(R_7R_8)$ contains a bisphosphonate group and corresponds to the functional group described above.

The comonomer repeat units of formulae (IV) and (V) can be prepared by using a diamine comonomer of the formulae $NH_2$—$R_4$—$N(R_6)$—$R_5$—$NH_2$ and $NH_2$—$R_4$—$C(R_7R_8)$—$R_5$—$NH_2$, respectively. An exemplary comonomer that can be used to prepare the comonomer repeat unit of formula (IV) is

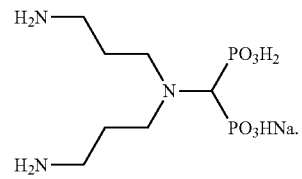

An exemplary comonomer that can be used to prepare the comonomer repeat unit of formula (V) is

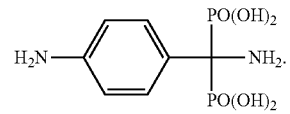

The comonomer repeat units of formulae (IV) and (V) can be incorporated into the polyurethane by reacting a diamine comonomer with a diisocyanate (such as those described below) to form a polyurea segment (e.g., a segment containing a —NH—C(O)—NH— linkage).

In general, the polyurethane described herein can include a sufficiently large amount of the functional group described above. For example, when the functional group is measured based on the content of phosphorous contained therein, the polyurethane can include at least about 0.1 wt % (e.g., at least about 0.2 wt %, at least about 0.3 wt %, at least about 0.5 wt %, at least about 1 wt %, or at least about 5 wt %) and/or at most about 20 wt % (e.g., at most about 15 wt %, at most about 10 wt %, at most about 5 wt %, at most about 1 wt %, or at most about 0.5 wt %) phosphorus. Without wishing to be bound by theory, it is believed that, a polyurethane containing a large amount of the functional group can have a significantly increased acid number. Such a polyurethane, when used in an ink composition, can greatly improve the jetting property of the ink composition (e.g., consistently allowing a sufficiently large amount of the ink composition (such as more than 30 ng per ink droplet) to be ejected from an inkjet printer nozzle during printing).

In some embodiments, the first comonomer repeat unit is of formula (I):

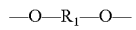

in which $R_1$ is $C_1$-$C_{10}$ alkylene, $C_3$-$C_{20}$ cycloalkylene, $C_3$-$C_{20}$ heterocycloalkylene, arylene, heteroarylene, or $C_1$-$C_{20}$ alkylarylene, each of which is substituted with at least one of the hydrophilic groups described above and optionally further substituted with $C_1$-$C_{10}$ alkyl or aryl. For example, $R_1$ can be $C_1$-$C_{10}$ alkylene substituted with a carboxylic acid (such as $CH_2C(R)(COOH)CH_2$ in which R can methyl, ethyl or propyl) or a salt thereof.

The first comonomer repeat unit of formula (I) can generally be formed from a diol monomer of the formula HO—$R_1$—OH, in which $R_1$ is defined above. For example, when $R_1$ is $CH_2C(CH_3)(COOH)CH_2$, the first comonomer repeat unit is formed by using

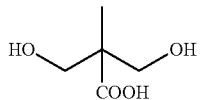

(i.e., dihydroxymethylpropionic acid) as a comonomer. As another example, when $R_1$ is $CH_2C(CH_2CH_3)(COOH)CH_2$, the first comonomer repeat unit is formed by using

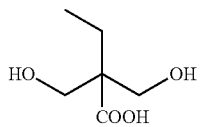

(i.e., dihydroxymethylbutanoic acid) as a comonomer.

The polyurethane described herein can include a sufficiently large amount of the first comonomer repeat unit. For example, the first comonomer repeat unit can be at least about 1% (e.g., at least about 2%, at least about 3%, at least about 5%, at least about 10%, or at least about 20%) and/or at most about 50% (e.g., at most about 40%, at most about 30%, at most about 20%, or at most about 10%) of the total weight of the polyurethane. Without wishing to be bound by theory, it is believed that including a sufficiently large amount of the first comonomer repeat unit can significantly increase the acid number of the polyurethane, which can greatly improve the jetting property of an ink composition containing such a polyurethane.

In some embodiments, when the polyurethane contains a sufficient amount of the functional group described above, the first comonomer repeat unit can be omitted from the polyurethane.

The polyurethane described herein can further include a second comonomer repeat unit of formula (II):

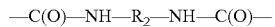

in which $R_2$ is $C_1$-$C_{10}$ alkylene, $C_3$-$C_{20}$ cycloalkylene, $C_3$-$C_{20}$ heterocycloalkylene, arylene, heteroarylene, or a combination thereof, each of which is optionally substituted with $C_1$-$C_{10}$ alkyl or aryl. For example, $R_2$ can be hexamethylene, phenylene optionally substituted with methyl, cyclohexylene optionally substituted with methyl,

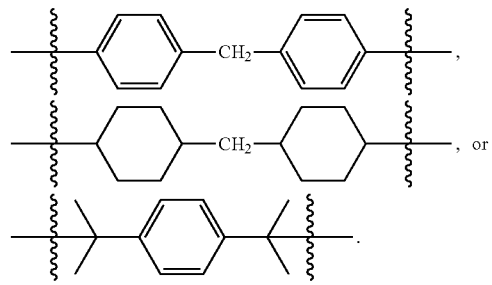

In general, the second comonomer repeat unit of formula (II) can be formed from a diisocyanate monomer of the formula OCN—$R_2$—NCO, in which $R_2$ is defined above. Exemplary diisocyanate monomers that can be used to form the second comonomer repeat unit include toluene 2,4-diisocyanate (2,4-TDI), toluene 2,6-diisocyanate (2,6-TDI), hexamethylene diisocyanate (HDI), 4,4'-methylene diphenyl diisocyanate (4,4'-MDI), 2,4'-methylene diphenyl diisocyanate (2,4'-MDI), 2,2'-methylene diphenyl diisocyanate (2,2'-MDI), methylene bis(4-cyclohexyl diisocyanate) (HDMI), m-tetramethylxylene diisocyanate (m-TMXDI), and isophorone diisocyanate (IPDI).

The polyurethane described herein can include a sufficiently large amount of the second comonomer repeat unit. In general, the molar ratio between the second comonomer repeat unit and the comonomer repeat unit derived from a diol (and a diamine, if used) in the polyurethane can range from about 1:1 to about 2:1. The weight percentage of the second comonomer repeat unit can range from at least about 3% (e.g., at least about 10) to at most about 50% (e.g., at most about 30%) of the polyurethane, depending on the molecular weights of the diisocyanate and diol monomers (and diamine monomers, if desired) used to formed the polyurethane.

The polyurethane described herein can further include a third comonomer repeat unit of formula (III):

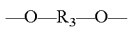

in which $R_3$ can include $C_1$-$C_{10}$ alkylene, $C_3$-$C_{20}$ cycloalkylene, $C_3$-$C_{20}$ heterocycloalkylene, arylene, heteroarylene, a polyether moiety (e.g., a polypropylene glycol moiety, a polytetramethyleneoxide moiety, or a polycaprolactone moiety), a polyester moiety (e.g., a poly(butylene adipate) moiety or a poly(hexamethylene adipate) moiety), a polycarbonate moiety (e.g., a polycarbonate moiety prepared from 2-butyl-2-ethylpropyl diol (such as that in the OXYMER series of products available from the Perstorp Group) or a polycarbonate moiety prepared from a mixture of 1,5-pentanediol and 1,6-hexanediol (such as that in the DURANOL series of products available from Asahi Kasei Chemical Corporation)), a polyacetal moiety, a polythioether moiety, a polyester amide moiety, a polyacrylate moiety, a polyolefin moiety, a polyalkylsiloxane moiety, or a mixture thereof.

The third comonomer repeat unit of formula (III) can generally be formed from a diol monomer of the formula HO—$R_3$—OH, in which $R_3$ is defined above. Exemplary diol monomers that can be used to form the third comonomer repeat unit include poly(propylene glycol), polytetramethyleneoxide diol, poly(butylene adipate) glycol, poly(hexamethylene adipate) diol, polycarbonate diol prepared from substituted or unsubstituted $C_1$-$C_{10}$ alkylene diols (e.g., 1,6-hexanediol, 1,5-pentanediol, or 2-butyl-2-ethylpropyl diol). The number-average molecular weight of a diol monomer of the formula HO—$R_3$—OH above can be from about 400 g/mol to about 6,000 g/mol (such as about 700 g/mol to about 2,000 g/mol). Such molecular weight can be determined by an end group analysis. As an example, a polycarbonate diol prepared from 1,5-pentanediol can have the following formula: $H(OCH_2CH_2CH_2CH_2CH_2OC(O))_nOCH_2(CH_2)_3CH_2OH$. As another example, polycarbonates containing hydroxyl groups include products obtained from the reaction of diols (such as propanediol, butanediol, hexanediol, diethylene glycol, triethylene glycol, or tetraethylene glycol) with phosgene, diarylcarbonates (such as diphenylcarbonate) or with cyclic carbonates (such as ethylene or propylene carbonate). In addition, polycarbonates can be obtained from the reaction between a polyester diol and phosgene, diaryl carbonates, or cyclic carbonates.

In general, the amount of the third comonomer repeat unit in the polyurethane described herein can vary as desired. The weight percentage of the third comonomer repeat unit can range from at least about 30% (e.g., at least about 40%) to at most about 95% (e.g., at most about 90%), depending on, e.g., the molecular weights of the diisocyanate and diol monomers used to formed the polyurethane and the reagents containing the functional group described above.

In some embodiments, when the polyurethane contains a sufficient amount of the first comonomer repeat unit, the third comonomer repeat unit can be omitted from the polyurethane.

When the polyurethane contains the first, second, and third comonomer repeat units and a function group as an end group, the polyurethane can have the following formula:

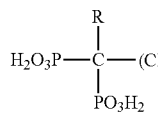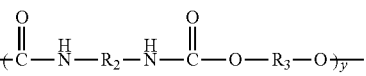

in which n, R, and $R_1$-$R_3$ are defined above, and each of x and y can be any integer ranging from 0-100. When the polyurethane contains the first, second, third, and fourth comonomer repeat units, the polyurethane can have the following formula:

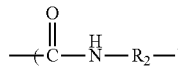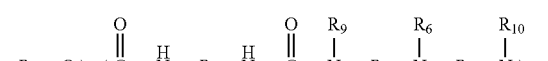

in which n, R, and $R_1$-$R_{10}$ are defined above, and each of x, y, and z can be any integer ranging from 0-100. When the polyurethane contains the first, second, third, and fifth comonomer repeat units, the polyurethane can have the following formula:

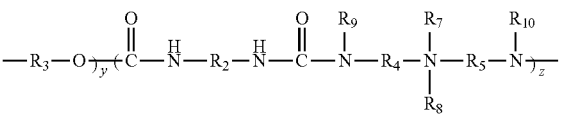

in which n, R, $R_1$-$R_5$, and $R_7$-$R_{10}$ are defined above, and each of x, y, and z can be any integer ranging from 0-100.

In general, the polyurethane described herein can have a relative large acid number. For example, the polyurethane can have an acid number of at least about 25 (e.g., at least about 30, at least about 35, at least about 40, at least about 45, or at least about 50) and/or at most about 200 (e.g., at most about 150, at most about 120, at most about 90, at most about 85, at most about 80, at most about 75, or at most about 70). Typically, the polyurethane has an acid number ranging from about 32 to about 64. Without wishing to be bound by theory, it is believed that using a polyurethane having a large acid number in an ink composition can improve the jetting property of the ink composition.

In general, the polyurethane described herein can have a suitable molecular weight. For example, the polyurethane can have a weight average molecular weight of at least about 10,000 g/mol (e.g., at least about 15,000 g/mol, at least about 20,000 g/mol, at least about 25,000 g/mol, at least about 30,000 g/mol) and/or at most about 150,000 g/mol (e.g., at most about 100,000 g/mol, at most about 80,000 g/mol, at most about 60,000 g/mol, at most about 40,000 g/mol). Typically, the polyurethane has a weight average molecular weight ranging from about 16,000 g/mol to about 75,000 g/mol. Without wishing to be bound by theory, it is believed that an ink composition containing a polyurethane described herein having a relatively low weight molecular weight (e.g., less than about 50,000 g/mol or less than about 30,000 g/mol) could result in images with improved durability. For example, images generated from such an ink composition can have little or no trail in a highlight smear test. Further, without wishing to be bound by theory, it is believed that, if the weight average molecular weight of the polyurethane is too large, the jetting capability of the ink composition containing such a polyurethane would be reduced.

Without wishing to be bound by theory, it is believed that, in some embodiments, an ink composition that includes a polyurethane containing a bisphosphonate group (and/or having a suitable acid number and/or a suitable weight average molecular weight) has a jetting property similar to or better than an ink composition including a similar polyurethane without a bisphosphonate group. In addition, the former ink composition can generate images with superior durability (e.g., with little or no trail in a highlight smear test) and/or optical density compared to the images generated by the latter composition. In certain embodiments, an ink composition containing a polyurethane described herein can have a superior jetting property and is still capable of generating images with superior optical density and durability. Further, without wishing to be bound by theory, it is believed that, when an ink composition described herein is used to print an image on a substrate (e.g., paper) containing multivalent cations (e.g., $Ca^{2+}$), which can be either present in the substrate before the printing or added to the substrate after the printing, the bisphosphonate group can interact with the multivalent cations and therefore substantially improve the image durability.

The polyurethane described herein can be made by methods known in the art, such as polycondensation reactions. The preparation typically involves multi-step synthetic processes. For example, a NCO-terminated prepolymer can be prepared by reacting a diol monomer containing hydrophilic group of the formula HO—$R_1$—OH (e.g., dihydroxymethyl propionic acid), a diisocyanate monomer of the formula OCN—$R_2$—NCO (e.g., a TDI), and a diol monomer of the formula HO—$R_3$—OH (e.g., polypropylene glycol), in which $R_1$-$R_3$ are defined above. The preparation of such a prepolymer can occur without any solvent or within a water-miscible organic solvent (e.g., acetone or N-methylpyrrolidone) that do not react with an isocyanate group. The preparation can be carried out optionally at an elevated temperature (e.g., at least about 50° C.) and/or in the presence of a catalyst (e.g., dibutyl tin dilaurate). The reaction time can range from a few minutes to a number of hours, and can depend on factors such as reaction temperature, concentrations of the monomers, reactivity of the monomers, and the presence or absence of a catalyst. The molar amounts of all monomers involved in the preparation of NCO-terminated prepolymer are normally selected based upon the ratio A/B, where A is the molar amount of isocyanate groups and B is the molar amount of the hydroxyl groups from all diol monomers (or diamine monomers, if used). The ratio A/B can range from at least about 1.0 (e.g., at least about 1.06) to at most about 2.0 (e.g., at most about 1.6). The NCO-terminated prepolymer thus obtained can have an isocyanate content (i.e., NCO %) of about 0.4% to about 20% based on the weight of the prepolymer.

After the preparation of a desired NCO-terminated prepolymer, a polyurethane containing a bisphosphonate group as an end group can be formed by a subsequent chain extension reaction of the prepolymer in the presence of an aqueous solution containing water and an end-capping agent having bisphosphonate groups

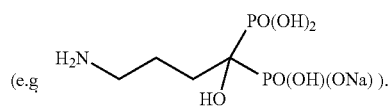

(e.g

The time for adding the aqueous solution can be controlled based upon the reaction conditions (e.g., reaction temperature and pH). During the end-capping reaction, the prepolymer solution can be optionally diluted with one of the water-miscible organic solvents described above if the viscosity of the prepolymer solution is too high. In some embodiments, the molar percentage of the terminal isocyanate that reacts with the end-capping reagent can be from about 20% to about 40%. Any isocyanate groups that are not reacted with an end-capping reagent typically react with water, which functions as a chain extender and extends the chain of the prepolymer. Depending on the efficiency of the end-capping reaction, the composition thus formed can include polyurethane molecules without any bisphosphonate group, polyurethane molecules with one bisphosphonate group, or polyurethane molecules with two bisphosphonate groups. This composition can be mixed with a pigment and a liquid vehicle to form an ink composition without further purification. Optionally, such composition can be purified to remove impurities and other undesirable species using any suitable method known in the art, such as ultrafiltration/diafiltration using a membrane, reverse osmosis, and/or ion exchange. Such a purified composition can then be mixed with a pigment and a liquid vehicle to form an ink composition.

As another example, a polyurethane containing a bisphosphonate group in the middle of its polymer chain can be prepared in a manner similar to that described above except that the end-capping reagent is replaced with a diamine comonomer of the formula —N($R_9$)—$R_4$—N($R_6$)—$R_5$—N($R_{10}$)— (IV) or —N($R_9$)—$R_4$—C($R_7R_8$)—$R_5$—N($R_{10}$)— (V) (e.g., dissolved in an aqueous solution). Such a diamine comonomer can act as a polymer chain extender and can further react with the isocyanate-terminated prepolymer to form a polyurethane containing a bisphosphonate group in the middle of the polymer chain.

In some embodiments, when the first comonomer containing acidic groups is used to make the polyurethane, neutralizing agents for converting the acid groups to salts can be used. Such neutralizing agents can include tertiary amines, alkali metal hydroxyl, and ammonia. Exemplary cations formed by this neutralization reaction include $Li^+$, $Na^+$, $K^+$, $Cs^+$, and $N(R_c)_4^+$, in which $R_c$ can be H, $C_1$-$C_{10}$ alkyl, or aryl. Neutralization can be performed at any suitable point during the preparation of the polyurethane, e.g., either before, during, or after the chain extension reaction of the NCO-terminated prepolymer.

In general, the polyurethane described herein can be included in an ink composition either as an additive or as a dispersant.

When the polyurethane is included in an ink composition as an additive, the polyurethane typically ranges from at least about 0.1% (e.g., at least about 0.25%, at least about 0.5%, at least about 1%, or at least about 2%) to at most about 10% (e.g., at most about 5%, at most about 4%, or at most about 3%) of the total weight of the ink composition. In such embodiments, the ink composition can either include a separate dispersant to disperse the pigment in the composition or include a self-dispersing pigment (e.g., a pigment modified with a dispersant). In such embodiments, the polyurethane is typically not substantially attached (either physically or chemically) to the pigment in the ink composition.

When the polyurethane is included in an ink composition as a dispersant, the polyurethane typically ranges from at least about 1% (e.g., at least about 1%, at least about 3%, at least about 5%, at least about 6%, at least about 7%, at least about 8%, or at least about 9%) to at most about 15% (e.g., at most about 14%, at most about 13%, at most about 12%, or at most about 11%) of the total weight of the ink composition. In such embodiments, the composition can include a pigment (e.g., an unmodified pigment) that cannot be dispersed in an ink composition by itself. In such embodiments, at least some of the molecules of the polyurethane are attached (either physically or chemically) to the pigment in the ink composition. The ink composition can also include one or more dispersants in addition to the polyurethane.

The composition described herein can optionally include a pigment. Examples of suitable pigments include blue pigments, black pigments (e.g., carbon black), brown pigments, cyan pigments, green pigments, white pigments, violet pigments, magenta pigments, red pigments, yellow pigments, orange pigments, or mixtures thereof. Examples of black pigments include various carbon blacks (e.g., Pigment Black 7) such as channel blacks, furnace blacks, gas blacks, and lamp blacks. Commercially available black pigments include, for example, carbon blacks sold under as REGAL, BLACK PEARLS, ELFTEX, MONARCH, MOGUL, and VULCAN trademarks available from Cabot Corporation (such as BLACK PEARLS 2000, BLACK PEARLS 1400, BLACK PEARLS 1300, BLACK PEARLS 1100, BLACK PEARLS 1000, BLACK PEARLS 900, BLACK PEARLS 880, BLACK PEARLS 800, BLACK PEARLS 700, BLACK PEARLS 570, BLACK PEARLS L, ELFTEX 8, MONARCH 1400, MONARCH 1300, MONARCH 1100, MONARCH 1000, MONARCH 900, MONARCH 880, MONARCH 800, MONARCH 700, REGAL 660, MOGUL L, REGAL 330, REGAL 400, VULCAN P). Carbon blacks available from other suppliers can also be used. Suitable classes of pigments include, for example, anthraquinones, phthalocyanine blues, phthalocyanine greens, diazos, monoazos, pyranthrones, perylenes, heterocyclic yellows, quinacridones, and (thio)indigoids. Examples of phthalocyanine blues include copper phthalocyanine blue and derivatives thereof (Pigment Blue 15). Examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Examples of anthraquinones include Pigment Red 43, Pigment Red 194 (Perinone Red), Pigment Red 216 (Brominated Pyrathrone Red) and Pigment Red 226 (Pyranthrone Red). Examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Examples of thioindigoids include Pigment Red 86, Pigment Red 87; Pigment Red 88, Pigment Red 181, Pigment Red 198, Pigment Violet 36, and Pigment Violet 38. Examples of heterocyclic yellow include Pigment Yellow 117 and Pigment Yellow 138. Other suitable examples of pigments include Pigment Yellow 1, 74, 155, 180, 185, 213, 218, 220, and 221, Pigment Red 254, and 269, and Pigment Blue 16 and 60. Examples of other suitable colored pigments are described, for example, in Colour Index, 3rd edition (The Society of Dyers and Colourist, 1982), and U.S. Application Publication Nos. 2007/0100023 and 2007/0100024.

Typically, the pigment can be at least about 0.5% (e.g., at least about 1%, at least about 2%, at least about 3%, or at least about 4%) and/or at most about 30% (e.g., at most about 20%, at least about 10%, at most about 8%, or at most about 6%) of the total weight of an ink composition.

The polyurethane and pigment described above can be mixed with a liquid vehicle to form an ink composition (e.g., a flexographic ink composition or an inkjet ink composition) by using methods well known in the art. The liquid vehicle can be a solution, a dispersion, a slurry, or an emulsion. The liquid vehicle can be an aqueous medium containing water (e.g., deionized or distilled water) or non-aqueous medium containing an organic solvent (e.g., an alcohol). For example, the amount of water or an organic solvent in an ink composition can range from at least about 60% (e.g., at least about 70%) to at most about 95% (e.g., at most about 90%) based on the weight of the ink composition. An inkjet ink composition can include the polyurethane and pigment described herein, and an aqueous vehicle (e.g., water or a water-containing mixture).

An ink composition can include suitable additives (e.g., humectants, biocides, binders, drying accelerators, penetrants, antifoaming agents, or surfactants) to impart certain desired properties while maintaining the stability of the compositions. For example, a humectant can be added to reduce the rate of evaporation of water in an ink composition to minimize print head nozzle clogging. If the ink composition begins to dry out, the humectant concentration increases and evaporation decreases further. Humectants can also affect other properties of the ink composition and the printed images made therefrom, such as viscosity, pH, surface tension, optical density, and print quality. Such humectants typically include ethylene glycol, propylene glycol, diethylene glycols, glycerine, dipropylene glycols, polyethylene glycols, polypropylene glycols, alkane diols, amides, ethers, carboxylic acids, esters, alcohols, organosulfides, organosulfoxides, sulfones, alcohol derivatives, 3-pyrrolidone, ether derivatives, amino alcohols, and ketones. The amount of a particular additive will vary depending on a variety of factors including the molecular weight of the polymers, the viscosity, the amount of any ammonium salt added, as well as the nature of the polymers, the nature of any organic groups attached to the pigment.

A printed image can be generated from an ink composition described herein by incorporating such a composition into a suitable printing apparatus (e.g., an inkjet printer) and generating an image onto a substrate. Examples of suitable inkjet printers include thermal printers, piezoelectric printers, continuous printers, and valve jet printers. An image can be printed on any suitable substrate, such as plain papers, bonded papers, coated papers, transparency materials, textile materials, plastics, polymeric films, and inorganic substrates.

All publications, references, applications, and patents referred to herein are incorporated by reference in their entirety.

The following examples are illustrative and not intended to be limiting.

EXAMPLES

Ink Evaluation

The inkjet ink compositions described in the following examples below were evaluated as follows.

The inkjet ink compositions were printed on paper using a Canon iP4000 thermal inkjet printer. Each inkjet ink composition was loaded into a Canon compatible cartridge (available from Inkjet Warehouse) and printed with the following printer settings: print quality: high; plain paper; grey scale; and no photo options selected. Images were printed on Hewlett-Packard multi-purpose printing paper (HPMP) and Xerox 4200 plain paper. Print properties of the resulting printed images were measured at various times after printing (particularly 5 minutes and 24 hours).

The optical density (OD) of the printed images was measured using either a SpectroEye Gretag or X-rite 938 spectrophotometers. For both instruments, the following settings were used: Illumination at D65, 2 degree Standard Observer, DIN density standard, white base set to Abs, and no filter. Results were reported as an average of OD values on these two papers. For each paper, OD value was reported as an average of at least three optical density measurements taken at two corners, and the middle of a page.

Smear resistance (i.e., smear-fastness) was measured in a highlight smear test (also referred to as the durability test) by using a yellow Sharpie ACCENT Yellow Highlighters #25025 as follows. A single pass or double pass (two swipes, one on top of the other) of the highlighter on a non-printed portion of the paper was performed to establish a reference value. Another single or double pass was then made across four 2-mm wide stripes printed 3 mm apart. Using the SpectroEye, the optical density (OD) value adjacent to the printed area for each swipe of the highlighter was measured, along with the reference OD value. The difference between the reference OD value and the measured OD value adjacent to the printed area (ΔOD) was the smear-fastness value. Usually, ΔOD values were recorded for tests from a single pass at 5 minutes after printing and a double pass at 24 hours after printing. The smear-fastness (i.e., durability) was ranked as:

A=no or little smearing is found (i.e., when at least three of four ΔOD values are no greater than 0.02, in which the four ΔOD values are measured from a single pass at 5 minutes after printing and a double pass at 24 hours after printing on HPMP and Xerox 4200 papers);

B=a slight amount of smearing is observed (i.e., when four ΔOD values stay outside the requirements for ranking A and ranking C, in which the four ΔOD values are measured from a single pass at 5 minutes after printing and a double pass at 24 hours after printing on HPMP and Xerox 4200 papers); and C=noticeable smearing is observed (i.e., when at least two of four ΔOD values are no less than 0.11, in which the four ΔOD values are measured from a single pass at 5 minutes after printing and a double pass at 24 hours after printing on HPMP and Xerox 4200 papers).

For each inkjet ink composition, its jetting was evaluated by two tests. These two tests are described as follows:

Jetting Test I: Each inkjet ink composition was printed using a Canon iP4000 thermal inkjet printer to generate 10 pages of solid (i.e., 100% ink coverage) black blocks (size: 6.5 inch×9.5 inch) with the following printer settings: print quality: normal; plain paper; grey scale; and no photo options selected. Images were printed on HPMP paper. These 10 pages of solid black prints were evaluated as:

Good=No or little defects;
Fair=Some missing lines on most of these 10 pages;
Poor=Many missing lines on most of these 10 pages; and
Worst=Ink was unable to print using Canon iP4000 printer.

Jetting Test II: For each inkjet ink composition, a drop weight test was also performed on an HP45 thermal inkjet cartridge, which was filled with the inkjet ink composition. A computer was used to control the selection of firing nozzles and the firing electrical parameters. The ink drops were collected and weighed. The average drop weight (ng) was obtained by firing each ink for about 10-50 million drops in the same conditions. The drop weight test results were evaluated as:

Good=the average drop weight was above 34 ng;
Fair=the average drop weight was between 30 and 34 ng; and
Poor=the average drop weight was below 30 ng.

Determination of the Molecular Weight of Polyurethanes

The molecular weights of the polyurethane in the Examples below were measured by a size exclusion chromatography as follows: A polyurethane was first dissolved in a solvent mixture containing water, trifluoroacetic acid, and tetrahydrofuran. The polyurethane solution was then injected into a Plgel Mixed-D column. The mobile phase was 0.1 vol % of trifluoroacetic acid in tetrahydrofuran. The weight-average molecular weight of polyurethane and its molecular weight distribution were determined from the comparison of the resulting data with polystyrene standards with known molecular weights.

Determination of the Phosphorus Content (P % Wt) in Polyurethanes

The polyurethane samples containing bisphosphonate groups were first dialyzed against deionized water by using a dialysis tube with an appropriate molecular weight cut off (i.e., MWCO) (e.g., Spectro/Por® Dialysis Membrane, MWCO 2 kD), or subjected to a diafiltration process with an appropriate filtration cartridge (e.g., GE® ultrafiltration flow cartridge with a nominal molecular weight cutoff of 100K), to remove all unreacted bisphosphonate-containing reagents.

These purified polyurethane samples were then analyzed by $^{31}$P NMR against an external standard to determine the phosphorus content (P % wt relative to the total polyurethane solid).

Determination of the Acid Number of Polyurethanes

For the polyurethanes without a functional group described above (e.g., a bisphosphonate group), its acid number (AN) was calculated by using the amounts of co-monomers that form the repeat units of formulae (I), (II), and (III) (hereinafter referred to as co-monomers I, II, and III) based on the following equation:

$$AN = \text{mole of co-monomer } I \times 56.1 \text{ mgKOH} \times 1000/(\text{the total mass(g) of co-monomer } I + \text{co-monomer } II + \text{co-monomer } III)$$

For the polyurethanes containing a functional group described above (e.g., a bisphosphonate group), its acid number was calculated by the following equation:

$$AN = \text{mole of co-monomer } I \times 56.1 \text{ mgKOH} \times 1000/(\text{the total mass(g) of co-monomer } I + \text{co-monomer } II + \text{co-monomer } III) + P \% \text{ wt}/31 \times 56.1 \text{ mgKOH} \times 2 \times 1000$$

Preparation of Bisphosphonate-Modified Carbon Black Dispersion

In Examples 1-6 described below, the pigment used was a modified carbon black (i.e., carbon black attached with at least one organic group), in which the organic group includes at least one geminal bisphosphonic acid group or salt thereof. This modified pigment can be prepared, for example, by using the procedure described in U.S. Patent Application Publication No. 20070100024. Examples 7 and 8 used unmodified carbon blacks.

ABBREVIATIONS AND COMMERCIAL SOURCES

TDI=toluene diisocyanate
DMPA=dimethylolpropionic acid (Bis-MPA™ from Perstorp)
DBTL=dibutyltin dilaurate
NMP=N-Methylpyrrolidone
KOH=potassium hydroxide
TEA=triethylamine
PEG600=a polyethylene glycol with a molecular weight of 600 g/mol
TMP=trimethylolpropane
SURFYNOL 465=a non-ionic surfactant from Air Products
ARCOL PPG-1000=Polypropylene glycol with a hydroxyl number of about 112 mg KOH/g (from Bayer MaterialScience LLC)
FOMREZ 44-114U=a polyester diol with a hydroxyl number of about 114 mg KOH/g (from Chemtura)
OXYMER M112=a polycarbonate diol with a hydroxyl number of about 112 mg KOH/g (from Perstorp)
DURANOL-T5651=a polycarbonate diol with a hydroxyl number of about 110 mgKOH/Wg (from Asahi Kasei Chemicals Corporation)
BP700=Carbon Black grade, BLACK PEARLS 700 (from Cabot Corporation)

The following Examples describe the preparation of NCO-terminated prepolymer followed by the chain extension in water in the presence or absence of reagents containing a functional group described above. In these Examples, the inkjet ink compositions contained bisphosphonate-modified carbon black dispersion and the polyurethane with or without any functional group.

Example I

Preparation of NCO-Terminated Prepolymer I

To a 1 liter cylindrical reactor, equipped with a temperature monitor, a stirrer, a condenser, and a nitrogen gas line, were added 186.6 g of ARCOL PPG-1000, 20.66 g of DMPA and 41.3 g of NMP. After the content was heated to 100° C. under fast nitrogen flow, high vacuum was applied. The clear, well mixed solution thus obtained was back flushed with nitrogen and then cooled to about 50-60° C. 62.7 g of TDI was then added to the mixture dropwise via an addition funnel or a plastic syringe, while the temperature was well controlled to remain below about 80° C. After a few minutes, 0.22 g of DBTL was added. The reaction temperature was then raised to about 80° C. and held for 3 hours. After the temperature was cooled to about 60-70° C., 460 mL of anhydrous acetone was added slowly under stirring. The prepolymer acetone solution was obtained and kept at about 40° C. under nitrogen. The NCO % was determined by titration to be 1.108. This batch of NCO-terminated prepolymer acetone solution was divided into several parts for the next step.

Preparation of Polyurethane Example IA (PU-IA)

Under stirring, about 90 g of the warm NCO-terminated prepolymer acetone solution obtained above was added quickly via a syringe or an addition funnel at room temperature to an aqueous solution containing about 200 g of deionized water, 3.1 g of sodium alendronate trihydrate, and 6.14 g of a 45 wt % KOH solution. The reaction mixture was kept stirring overnight, and then acetone was removed under vacuum. A final solution containing a polyurethane having bisphosphonate groups was obtained: 14.3% solid, Mw=22,600 g/mol, AN=47.1, P % wt=0.42.

Preparation of Polyurethane Comparative Example IB (PU-IB)

Under stirring, about 90 g of the warm NCO-terminated prepolymer acetone solution obtained above was added quickly via a syringe or an addition funnel at room temperature to an aqueous solution containing about 200 g of deionized water and 2.57 g of a 45 wt % KOH solution. The reaction mixture was kept stirring overnight, and then acetone was removed under vacuum. A final solution containing a polyurethane without any bisphosphonate group was obtained: 13.1% solid, Mw=55,700 g/mol, AN=32.

Preparation of Polyurethane Comparative Example IC (PU-IC)

Under stirring, about 90 g of the warm NCO-terminated prepolymer acetone solution obtained was added quickly via a syringe or an addition funnel at room temperature to an aqueous solution containing about 200 g of deionized water, 1 g of diethanolamine, and 2.57 g of a 45 wt % KOH solution. The reaction mixture was kept stirring overnight, and then acetone was removed under vacuum. A final solution containing a polyurethane without any bisphosphonate group was obtained: 13.9% solid, Mw=18,000 g/mol, AN=32.

Ink Compositions and Their Test Results

The polyurethane example and comparative examples were used as additives to make ink compositions using the formulation shown in Table 1. The amounts listed are in weight percent of the final ink composition. The pigment dispersions and polyurethanes are quoted on a solid basis. The test results of these ink compositions were summarized in Table 3.

The polyurethane of Example IA included bisphosphonate groups, while the polyurethanes of Comparative Examples IB and IC did not include any bisphosphonate groups. In addition, the polyurethane of Example IA had a higher acid number than that of the polyurethanes of Comparative Examples IB and IC, and a relative low weight average molecular weight compared to those of the polyurethanes of Comparative Examples IB and IC. As shown in Table 3, the ink composition containing the polyurethane of Example IA exhibited superior overall performance (i.e., superior jetting capability and similar or better image durability while maintaining high image optical density) compared to the ink compositions containing the polyurethanes of Comparative Examples IB and IC.

Example II

Preparation of NCO-Terminated Prepolymer II

To a 1 liter cylindrical reactor equipped with a temperature monitor, a stirrer, a condenser, and a nitrogen gas line were added 136.6 g of ARCOL PPG-1000, 20.9 g of DMPA and 41.8 g of NMP. After the content was heated to 100° C. under fast nitrogen flow, high vacuum was applied. The clear, well mixed solution thus obtained was back flushed with nitrogen and then cooled to about 50-60° C. 61 g of TDI was added to the mixture dropwise via an addition funnel or a plastic syringe, while the temperature was well controlled to remain below about 80° C. The reaction temperature was then raised to about 80° C. and held for 4 hours. After the temperature was cooled to about 60-70° C., 365 mL of anhydrous acetone was added slowly under stirring. A polymer acetone solution was obtained and kept at about 40° C. under nitrogen. The NCO % was determined by titration to be 2.209. This batch of NCO-terminated prepolymer acetone solution was divided into several parts for the next step.

Preparation of Polyurethane Example IIA (PU-IIA)

Under stirring, about 90 g of the warm NCO-terminated prepolymer acetone solution obtained above was added quickly via a syringe or an addition funnel at room temperature to an aqueous solution contain about 200 g of deionized water, 6.2 g of sodium alendronate trihydrate, and 10.3 g of a 45 wt % KOH solution. The reaction mixture was kept stirring overnight, and then acetone was removed under vacuum. A final solution containing a polyurethane having bisphosphonate groups was obtained: 18.0% solid, Mw=13,600 g/mol, AN=70.4, P % wt=0.84.

Preparation of Polyurethane Example IIB (PU-IIB)

Under stirring, about 90 g of the warm NCO-terminated prepolymer acetone solution obtained above was added quickly via a syringe or an addition funnel at room temperature to an aqueous solution containing about 200 g of deionized water, 6.2 g of sodium alendronate trihydrate, and 7.9 g of a 45 wt % KOH solution. The reaction mixture was kept stirring overnight, and then acetone was removed under vacuum. A final solution containing a polyurethane having bisphosphonate groups was obtained: 19.1% solid, Mw=23,000 g/mol, AN=77.4, P % wt=1.03.

Preparation of Polyurethane Comparative Example IIC (PU-IIC)

Under stirring, about 90 g of the warm NCO-terminated prepolymer acetone solution thus obtained was added quickly via a syringe or an addition funnel at room temperature to an aqueous solution containing about 200 g of deionized water and 3.2 g of a 45 wt % KOH solution. The reaction mixture was kept stirring overnight, and then acetone was removed under vacuum. A final solution containing a polyurethane without any bisphosphonate group was obtained: 16.4% solid, Mw=127,000 g/mol, AN=40.

Ink Compositions and Their Test Results

The above polyurethane examples and comparative example were used as additives to make ink compositions using the formulation shown in Table 1. The amounts listed are in weight percent of the final ink composition. The pigment dispersions and polyurethanes are quoted on a solid basis. The test results of these ink compositions were summarized in Table 3.

The polyurethanes of Examples IIA and IIB included bisphosphonate groups, while the polyurethane of Comparative Example IIC did not include any bisphosphonate groups. In addition, the polyurethanes of Examples IIA and IIB had higher acid numbers and lower weight average molecular weights than those of the polyurethane of Comparative Example IIC. As shown in Table 3, the ink compositions containing the polyurethanes of Example IIA and IIB exhibited superior overall performance (i.e., superior jetting capability and similar or better image durability while providing much higher image optical density) compared to the ink composition containing the polyurethane of Comparative Example IIC.

Example III

Preparation of NCO-Terminated Prepolymer III

To a 1 liter cylindrical reactor equipped with a temperature monitor, a stirrer, a condenser, and a nitrogen gas line were added 121.1 g of ARCOL PPG-1000, 34.5 g of DMPA, and 69.0 g of NMP. After the content was heated to 100° C. under fast nitrogen flow, high vacuum was applied. The clear, well mixed solution thus obtained was back flushed with nitrogen and then cooled to about 50-60° C. 69.7 g of TDI was then added to the mixture dropwise via an addition funnel or a plastic syringe, while the temperature was well controlled to remain below about 80° C. After a few minutes, 0.18 g of DBTL was added. The reaction temperature was then raised to about 80° C. and held for 3 hours. After the temperature was cooled to about 60-70° C., 580 mL of anhydrous acetone was added slowly under stirring. A polymer acetone solution was obtained and kept at about 40° C. under nitrogen. The NCO % was determined by titration to be 0.889. 22.3 mL of TEA was then added to this batch of NCO-terminated prepolymer acetone solution, followed by stirring for about 30 minute at about 40° C. under nitrogen. The solution thus obtained was divided into several parts for the next step.

Preparation of Polyurethane Example IIIA (PU-IIIA)

Under stirring, about 110 g of the warm NCO-terminated prepolymer acetone solution obtained above was added quickly via a syringe or an addition funnel at room temperature to an aqueous solution contain about 180 g of deionized water, 2.2 g of sodium alendronate trihydrate, and 18.8 g of a 10 wt % KOH solution. The reaction mixture was kept stirring overnight, and then acetone was removed under vacuum. A final solution containing a polyurethane having bisphosphonate groups was obtained: 13.1% solid, Mw=46,000 g/mol, AN=81.5, P % wt=0.48.

Preparation of Polyurethane Comparative Example IIIB (PU-IIIB)

Under stirring, about 110 g of the warm NCO-terminated prepolymer acetone solution obtained above was added quickly via a syringe or an addition funnel at room temperature to an aqueous solution containing about 180 g of deionized water and 7.3 g of a wt % KOH solution. The reaction mixture was kept stirring overnight, and then acetone was removed under vacuum. A final solution containing a polyurethane without any bisphosphonate group was obtained: 14.8% solid, Mw=71,700 g/mol, AN=64.

Ink Compositions and Their Test Results

The above polyurethane example and comparative example were used as additives to make ink compositions using the formulation shown in Table 1. The amounts listed are in weight percent of the final ink composition. The pigment dispersions and polyurethanes are quoted on a solid basis. The testing results of these ink compositions were summarized in Table 3.

The polyurethane of Example IIIA included bisphosphonate groups, while the polyurethane of Comparative Example IIIB did not include any bisphosphonate groups. In addition, the polyurethane of Example IIIA had a higher acid number and a lower weight average molecular weight than those of the polyurethane of Comparative Example IIIB. As shown in Table 3, the ink composition containing the polyurethane of Example IIIA exhibited superior overall performance (i.e., superior jetting capability and image durability while providing high image optical density) compared to the ink composition containing the polyurethane of Comparative Example IIIB.

Example IV

Preparation of NCO-Terminated Prepolymer IV

To a 1 liter cylindrical reactor equipped with a temperature monitor, a stirrer, a condenser, and a nitrogen gas line, were added 145.0 g of FOMREZ 44-114U, 27.2 g of DMPA, and 54.4 g of NMP. After the content was heated to 100° C. under fast nitrogen flow, high vacuum was applied. The clear, well mixed solution thus obtained was back flushed with nitrogen and then cooled to about 50-60° C. 64.5 g of TDI was then added to the mixture dropwise via an addition funnel or a plastic syringe, while the temperature was well controlled to remain below about 80. After a few minutes, 0.19 g of DBTL was added. The reaction temperature was then raised to about 80° C. and held for 3 hours. After the temperature was cooled to about 60-70° C., 385 mL of anhydrous acetone was added slowly under stirring. A prepolymer acetone solution was obtained and kept at about 40° C. under nitrogen. The NCO % was determined by titration to be 0.934. This batch of NCO-terminated prepolymer acetone solution was divided into several parts for the next step.

Preparation of Polyurethane Example IVA (PU-IVA)

Under stirring, about 90 g of the warm NCO-terminated prepolymer acetone solution obtained above was added quickly via a syringe or an addition funnel at room temperature to an aqueous solution containing about 200 g of deionized water, 2.73 g of sodium alendronate trihydrate, and 5.93 g of a 45 wt % KOH solution. The reaction mixture was kept stirring overnight, and then acetone was removed under vacuum. A final solution containing a polyurethane having bisphosphonate groups was obtained: 16.9% solid, Mw=16,000 g/mol, AN=58.8, P % wt=0.30.

Preparation of Polyurethane Comparative Example IVB (PU-IVB)

Under stirring, about 90 g of the warm NCO-terminated prepolymer acetone solution obtained above was added quickly via a syringe or an addition funnel at room temperature to an aqueous solution containing about 200 g of deionized water and 3.8 g of a 45 wt % KOH solution. The reaction mixture was kept stirring overnight, and then acetone was removed under vacuum. A final solution containing a polyurethane without any bisphosphonate group was obtained: 16.5% solid, Mw=23,800 g/mol, AN=48.

Ink Compositions and Their Test Results

The above polyurethane example and comparative example were used as additives to make ink compositions using the formulation shown in Table 2. The amounts listed are in weight percent of the final ink composition. The pigment dispersions and polyurethanes are quoted on a solid basis. The test results of these ink compositions were summarized in Table 3.

The polyurethane of Example IVA included bisphosphonate groups, while the polyurethane of Comparative Example IVB did not include any bisphosphonate groups. In addition, the polyurethane of Example IVA had a higher acid number and a lower weight average molecular weight than those of the polyurethane of Comparative Example IVB. As shown in Table 3, the ink composition containing the polyurethane of Example IVA exhibited superior overall performance (i.e., superior jetting capability and similar image durability while providing much higher image optical density) compared to the ink composition containing the polyurethane of Comparative Example IVB.

Example V

Preparation of NCO-Terminated Prepolymer V

To a 1 liter cylindrical reactor equipped with a temperature monitor, a stirrer, a condenser, and a nitrogen gas line, were added 146.2 g of OXYMER M112, 41.5 g of DMPA, and 83.0 g of NMP. After the content was heated to 100° C. under fast nitrogen flow, high vacuum was applied. The clear, well mixed solution thus obtained was back flushed with nitrogen and then cooled to about 50-60° C. 83.6 g of TDI was then added to the mixture dropwise via an addition funnel or a plastic syringe, while the temperature was well controlled to remain below about 80° C. The reaction temperature was then raised to about 80° C. and held for 3 hours. After the temperature was cooled to about 60-70° C., 1270 mL of anhydrous acetone was added slowly under stirring. A prepolymer acetone solution was obtained and kept at about 40° C. under nitrogen. The NCO % was determined by titration to be 1.458. 40.1 mL of TEA was then added to this batch of NCO-terminated prepolymer acetone solution, followed by stirring for about 30 minute at about 40° C. under nitrogen. The solution thus obtained was divided into several parts for the next step.

Preparation of Polyurethane Example VA (PU-VA)

Under stirring, about 180 g of the warm NCO-terminated prepolymer acetone solution obtained above was added quickly via a syringe or an addition funnel at room temperature to an aqueous solution containing about 250 g of deionized water, 4.1 g of sodium alendronate trihydrate, and 4.7 g of a 45 wt % KOH solution. The reaction mixture was kept stirring overnight, and then acetone was removed under vacuum. A final solution containing a polyurethane having bisphosphonate groups was obtained: 14.1% solid, Mw=25,300 g/mol, AN=87.4, P % wt=0.65.

Preparation of Polyurethane Comparative Example VB (PU-VB)

Under stirring, about 180 g of the warm NCO-terminated prepolymer acetone solution obtained above was added quickly via a syringe or an addition funnel at room temperature to an aqueous solution containing about 250 g of deionized water. The reaction mixture was kept stirring overnight, and then acetone was removed under vacuum. A final solution containing a polyurethane without any bisphosphonate group was obtained: 11.6% solid, Mw=53,700 g/mol, AN=64.

Preparation of Polyurethane Comparative Example VC (PU-VC)

Under stirring, about 180 g of the warm NCO-terminated prepolymer acetone solution obtained above was added quickly via a syringe or an addition funnel to a room temperature to an aqueous solution containing about 250 g of deionized water and 1.3 g of diethanolamine. The reaction mixture was kept stirring overnight, and then acetone was removed under vacuum. A final solution containing a polyurethane without any bisphosphonate group was obtained: 14.4% solid, Mw=16,600 g/mol, AN=64.

Ink Compositions and their Test Results

The above polyurethane example and comparative examples were used as additives to make ink compositions using the formulation shown in Table 2. The amounts listed are in weight percent of the final ink composition. The pigment dispersions and polyurethanes are quoted on a solid basis. The test results of these ink compositions were summarized in Table 3.

The polyurethane of Example VA included bisphosphonate groups, while the polyurethanes of Comparative Examples VB and VC did not include any bisphosphonate groups. In addition, the polyurethane of Example VA had a higher acid number than those of the polyurethanes of Comparative Examples VB and VC, and a relatively low weight average molecular weight compared to those of the polyurethanes of Comparative Examples VB and VC. As shown in Table 3, the ink composition containing the polyurethane of Example VA exhibited superior overall performance (i.e., superior jetting capability, image durability, and image optical density) compared to the ink compositions containing the polyurethanes of Comparative Examples VB and VC.

Example VI

Preparation of NCO-Terminated Prepolymer VI

To a 1 liter cylindrical reactor equipped with a temperature monitor, a stirrer, a condenser, and a nitrogen gas line, were added 139.8 g of DURANOL-T5651, 26.1 g of DMPA, and 52.2 g of NMP. After the content was heated to 100° C. under fast nitrogen flow, high vacuum was applied. The clear, well mixed solution thus obtained was back flushed with nitrogen and then cooled to about 50-60° C. 61.8 g of TDI was then added to the mixture dropwise via an addition funnel or a plastic syringe, while the temperature was well controlled to remain below about 80° C. After a few minutes, 0.18 g of DBTL was added. The reaction temperature was then raised to about 80° C. and held for about 2 hours. After the temperature was cooled to about 60° C., 370 mL of anhydrous acetone was added slowly under stirring. A prepolymer acetone solution was obtained and kept at about 40° C. under nitrogen. The NCO % was determined by titration to be 1.139. This batch of NCO-terminated prepolymer acetone solution was divided into several parts for the next step.

Preparation of Polyurethane Example VIA (PU-VIA)

Under stirring, about 90 g of the warm NCO-terminated prepolymer acetone solution obtained above was added quickly via a syringe or an addition funnel at room temperature to an aqueous solution containing about 200 g of deionized water, 3.33 g of sodium alendronate trihydrate, and 34.5 g of a 10 wt % KOH solution. The reaction mixture was kept stirring overnight, and then acetone was removed under vacuum. A final solution containing a polyurethane having bisphosphonate groups was obtained: 12.0% solid, Mw=23,400 g/mol, AN=63.8, P % wt=0.44.

Preparation of Polyurethane Comparative Example VIB (PU-VIB)

Under stirring, about 90 g of the warm NCO-terminated prepolymer acetone solution obtained above was added quickly via a syringe or an addition funnel at room temperature to an aqueous solution containing about 200 g of deionized water and 17.3 g of a 10 wt % KOH solution. The reaction mixture was kept stirring overnight, and then acetone was removed under vacuum. A final solution containing a polyurethane without any bisphosphonate group was obtained: 14.2% solid, Mw=51,600 g/mol, AN=48.

Ink Compositions and Their Test Results

The above polyurethane example and comparative example were used as additives to make ink compositions using the formulation shown in Table 2. The amounts listed are in weight percent of the final ink composition. The pigment dispersions and polyurethanes are quoted on a solid basis. The test results of these ink compositions were summarized in Table 3.

The polyurethane of Example VIA included bisphosphonate groups, while the polyurethane of Comparative Example VIB did not include any bisphosphonate groups. In addition, the polyurethane of Example VIA had a higher acid number and a lower weight average molecular weight than those of the polyurethane of Comparative Example VIB. As shown in Table 12, the ink composition containing the polyurethane of Example VIA exhibited superior overall performance (i.e., superior jetting capability and image durability while maintaining high image optical density) compared to the ink composition containing the polyurethane of Comparative Example VIB.

TABLE 1

| Component | Ex IA | Comp Ex IB | Comp Ex IC | Ex IIA | Ex IIB | Comp Ex IIC | Ex IIIA | Comp Ex IIIB |
|---|---|---|---|---|---|---|---|---|
| Black Dispersion (pigment) | 4% | 4% | 4% | 4% | 4% | 4% | 4% | 4% |
| PU-IA | 1% | | | | | | | |
| PU-IB | | 1% | | | | | | |
| PU-IC | | | 1% | | | | | |
| PU-IIA | | | | 2% | | | | |
| PU-IIB | | | | | 2% | | | |
| PU-IIC | | | | | | 2% | | |
| PU-IIIA | | | | | | | 1% | |
| PU-IIIB | | | | | | | | 1% |
| Glycerol | 5% | 5% | 5% | 5% | 5% | 5% | 5% | 5% |
| PEG600 | 5% | 5% | 5% | 5% | 5% | 5% | 5% | 5% |
| TMP | 3% | 3% | 3% | 3% | 3% | 3% | 3% | 3% |
| Surfynol ® 465 | 0.1% | 0.1% | 0.1% | 0.1% | 0.1% | 0.1% | 0.1% | 0.1% |
| Water | balance | balance | balance | balance | balance | balance | balance | balance |

TABLE 2

| Component | Ex IVA | Comp Ex IVB | Ex VA | Comp Ex VB | Comp Ex VC | Ex VIA | Comp Ex VIB |
|---|---|---|---|---|---|---|---|
| Black Dispersion (pigment) | 4% | 4% | 4% | 4% | 4% | 4% | 4% |
| PU-IVA | 1% | | | | | | |
| PU-IVB | | 1% | | | | | |
| PU-VA | | | 1% | | | | |
| PU-VB | | | | 1% | | | |
| PU-VC | | | | | 1% | | |
| PU-VIA | | | | | | 2% | |
| PU-VIB | | | | | | | 2% |
| Glycerol | 5% | 5% | 5% | 5% | 5% | 5% | 5% |
| PEG600 | 5% | 5% | 5% | 5% | 5% | 5% | 5% |
| TMP | 3% | 3% | 3% | 3% | 3% | 3% | 3% |
| Surfynol ® 465 | 0.1% | 0.1% | 0.1% | 0.1% | 0.1% | 0.1% | 0.1% |
| Water | balance | balance | balance | balance | balance | balance | balance |

TABLE 3

| Inks | PU % in ink | OD | Jetting Test I Ranking | Jetting Test II Ranking | Durability Ranking |
|---|---|---|---|---|---|
| Ex IA | 1 | 1.46 | Good | Good | B |
| Comp Ex IB | 1 | 1.40 | Fair | Poor | B |
| Comp Ex IC | 1 | 1.45 | Good | Fair | C |
| Ex IIA | 2 | 1.47 | Good | Good | B |
| Ex IIB | 2 | 1.44 | Good | Good | A |
| Comp Ex IIC | 2 | 1.21 | Poor | Poor | A |
| Ex IIIA | 1 | 1.51 | Good | Good | A |
| Comp Ex IIIB | 1 | no value* | Worst | Poor | no ranking* |
| Ex IVA | 1 | 1.48 | Good | Good | A |
| Comp Ex IVB | 1 | 1.32 | Fair | Good | A |
| Ex VA | 1 | 1.45 | Good | Fair | B |
| Comp Ex VB | 1 | no value* | Worst | Poor | no ranking* |
| Comp Ex VC | 1 | 1.34 | Poor | Poor | C |
| Ex VIA | 2 | 1.45 | Good | Good | A |
| Comp Ex VIB | 2 | 1.41 | Fair | Poor | A |

*Since such example was unable to print in iP4000 printer, both OD measurement and durability test were unable to be performed.

Example VII

Preparation of Carbon Black Dispersion by Using PU-IVA (PU-IVA-BP700-1)

First, about 55 g of a polyurethane dispersion (i.e., containing 16.4% PU-IVA solids) was diluted with 200 g of DI water. After about 18 g carbon black BP700 was added, the resultant mixture stirred rapidly to incorporate the dry powder. This mixture was then sonicated at about 5-12° C. using a Misonix probe sonicator for about 1.5 hours to afford a black dispersion with a mean particle size of about 150 nm (determined by using a Microtrac® Particle Size Analyzer). The disperison was centrifuged at 2,500 G for about 10 minutes, and then decanted to isolate the product. A final solution containing 9.75% polyurethane-dispersed carbon black was obtained.

Ink Composition and its Test Results

The pigment dispersion was used as a dispersant to make an ink composition using the formulation shown in Table 4. The amounts listed are in weight percent of the final ink composition. The pigment dispersions and polyurethanes are quoted on a solid basis. The test results of this ink composition were summarized in Table 5.

As shown in Table 5, the ink composition containing the polyurethane of Example VII exhibited excellent overall performance (i.e., excellent jetting capability and image durability).

Example VIII

Preparation of Carbon Black Dispersion by Using PU-IVA (PU-IVA-BP700-2)

First, about 41 g of a polyurethane dispersion (i.e., containing 16.4% PU-IVA solids) was diluted with 200 g of DI water. After about 20 g carbon black BP700 was added, the resultant mixture was stirred rapidly to incorporate the dry powder. This mixture was then sonicated at about 5-12° C. using a Misonix probe sonicator for about 1.5 hours to afford a black dispersion with a mean particle size of about 150 nm (determined by using a Microtrac® Particle Size Analyzer). The dispersion was centrifuged at 2,500 G for about 10 minutes, and then decanted to isolate the product. A final solution containing 9.52% polyurethane-dispersed carbon black was obtained.

Ink Composition and Its Test Results

The pigment dispersion was used as a dispersant to make an ink composition using the formulation shown in Table 4. The amounts listed are in weight percent of the final ink composition. The pigment dispersions and polyurethanes are quoted on a solid basis. The test results of this ink composition were summarized in Table 5.

As shown in Table 5, the ink composition containing the polyurethane of Example VIII exhibited excellent overall performance (i.e., excellent jetting capability and image durability).

TABLE 4

| Component | Ex VII | Ex VIII |
|---|---|---|
| PU-IVA-BP700-1 | 6% | |
| PU-IVA-BP700-2 | | 5% |
| Glycerol | 5% | 5% |
| PEG600 | 5% | 5% |
| TMP | 3% | 3% |
| Surfynol ® 465 | 0.1% | 0.1% |
| Water | balance | balance |

TABLE 5

| Inks | OD | Jetting Ranking | Durability Ranking |
|---|---|---|---|
| Ex VII | 1.24 | B | A |
| Ex VIII | 1.31 | B | A |

Other embodiments are in the claims.
What is claimed is:
1. A composition, comprising:
a polyurethane;
a pigment; and
a liquid vehicle,
wherein the polyurethane comprises:
a first comonomer repeat unit that comprises a hydrophilic group, and
a functional group different from the hydrophilic group, the functional group comprising $(CH_2)_nC(R)(PO_3H_2)_2$ or an ester or salt thereof wherein the functional group is an end group of the polyurethane, and wherein n is 0-9 and R is H, $R_a$, $OR_a$, $SR_a$, or $NR_aR_b$, in which each of $R_a$ and $R_b$, independently, being H, $C_1$-$C_{10}$ alkyl, or aryl.
2. The composition of claim 1, wherein the pigment comprises carbon black.
3. The composition of claim 1, wherein the liquid vehicle comprises an aqueous solution.
4. A polyurethane, comprising:
a comonomer repeat unit of formula (IV) or (V):

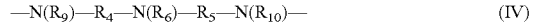

$$-N(R_9)-R_4-N(R_6)-R_5-N(R_{10})- \qquad (IV)$$

or

$$-N(R_9)-R_4-C(R_7R_8)-R_5-N(R_{10})- \qquad (V)$$

wherein
each of $R_4$ and $R_5$, independently, is a bond, $C_1$-$C_{10}$ alkylene, $C_3$-$C_{20}$ cycloalkylene, $C_3$-$C_{20}$ heterocloalkylene, arylene, or heteroarylene, each of which being optionally substituted with $C_1$-$C_{10}$ alkyl or aryl, provided that at least one of $R_4$ and $R_5$ is not a bond;
$R_6$ is $(CH_2)_nC(R)(PO_3H_2)_2$ or an ester or salt thereof, in which n is 0-9 and R is H, $R_a$, $OR_a$, $SR_a$, or $NR_aR_b$, each of $R_a$ and $R_b$, independently, being H, $C_1$-$C_{10}$ alkyl, or aryl;

each of $R_7$ and $R_8$, independently, is H, $R_c$, $OR_c$, $SR_c$, $NR_cR_d$, $PO_3H_2$ or an ester or salt thereof, or $(CH_2)_mC(R')(PO_3H_2)_2$ or an ester or salt thereof, in which m is 0-9 and R' is H, $R_c$, $OR_c$, $SR_c$, or $NR_cR_d$, each of $R_c$ and $R_d$, independently, being H, $C_1$-$C_{10}$ alkyl, or aryl, provided that, if neither of $R_7$ and $R_8$ is $(CH_2)_mC(R')(PO_3H_2)_2$ or an ester or salt thereof, both of $R_7$ and $R_8$ are $PO_3H_2$ or an ester or salt thereof; and each of $R_9$ and $R_{10}$, independently, is H, $C_1$-$C_{10}$ alkyl, or aryl.

5. A composition, comprising:
the polyurethane of claim 4; and
a liquid vehicle.

6. The composition of claim 1, wherein the functional group comprises a partial salt of $(CH_2)_nC(R)(PO_3H_2)_2$, and the partial salt comprises an anion formed from $(CH_2)_nC(R)(PO_3H_2)_2$ and a cation selected from the group consisting of $Li^+$, $Na^+$, $K^+$, $Cs^+$, or $N(R_c)_4^+$, in which $R_c$ is H, $C_1$-$C_{10}$ alkyl, or aryl.

7. The composition of claim 1, wherein the functional group comprises a partial salt containing $K^+$ and an anion formed from $(CH_2)_nC(R)(PO_3H_2)_2$.

8. The composition of claim 1, wherein n is 1-3 and R is $OR_a$.

9. The composition of claim 1, wherein n is 3 and R is OH.

10. The composition of claim 1, wherein the polyurethane comprises two functional groups that comprise $(CH_2)_nC(R)(PO_3H_2)_2$ or an ester or salt thereof, each of which is an end group of the polyurethane.

11. The composition of claim 1, wherein the polyurethane comprises at least about 0.1 wt % phosphorus.

12. The composition of claim 1, wherein the hydrophilic group comprises a carboxylic acid group, a sulfonic acid group, a phosphonic acid group, a hydroxyl group, a polyether group, or a salt thereof.

13. The composition of claim 1, wherein the first comonomer repeat unit is of formula (I):

  (I), in which $R_1$ is $C_1$-$C_{10}$ alkylene, $C_3$-$C_{20}$ cycloalkylene, $C_3$-$C_{20}$ heterocycloalkylene, arylene, heteroarylene, or $C_1$-$C_{20}$ alkylarylene, each of which is substituted with the hydrophilic group and optionally further substituted with $C_1$-$C_{10}$ alkyl or aryl.

14. The composition of claim 13, wherein $R_1$ is $C_1$-$C_{10}$ alkylene substituted with a carboxylic acid or a salt thereof.

15. The composition of claim 13, wherein $R_1$ is $CH_2C(CH_3)(COOH)CH_2$ or a salt thereof.

16. The composition of claim 1, wherein the first comonomer repeat unit is at least about 1% of the total weight of the polyurethane.

17. The composition of claim 1, wherein the polyurethane further comprises a second comonomer repeat unit of formula (II):

—C(O)—NH—$R_2$—NH—C(O)—  (II), in which $R_2$ is $C_1$-$C_{10}$ alkylene, $C_3$-$C_{20}$ cycloalkylene, $C_3$-$C_{20}$ heterocycloalkylene, arylene, heteroarylene, or a combination thereof, each of which is optionally substituted with $C_1$-$C_{10}$ alkyl or aryl.

18. The composition of claim 17, wherein $R_2$ is $C_1$-$C_{10}$ alkylene, $C_3$-$C_{20}$ cycloalkylene, arylene, or a combination thereof.

19. The composition of claim 17, wherein $R_2$ is hexamethylene, phenylene optionally substituted with methyl, cyclohexylene optionally substituted with methyl,

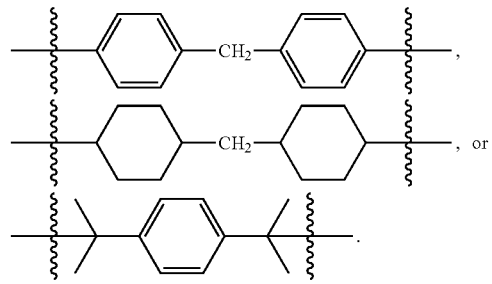

20. The composition of claim 1, wherein the polyurethane further comprises a third comonomer repeat unit of formula (III):

—O—$R_3$—O—  (III), wherein $R_3$ comprises $C_1$-$C_{10}$ alkylene, $C_3$-$C_{20}$ cycloalkylene, $C_3$-$C_{20}$ heterocycloalkylene, arylene, heteroarylene, a polyether moiety, a polyester moiety, a polycarbonate moiety, a polyacetal moiety, a polythioether moiety, a polyester amide moiety, a polyacrylate moiety, a polyolefin moiety, a polyalkylsiloxane moiety, or a mixture thereof.

21. The composition of claim 20, wherein $R_3$ comprises a polypropylene glycol moiety, a polytetramethyleneoxide moiety, a poly(butylene adipate) moiety, a poly(hexamethylene adipate) moiety, a polycarbonate moiety prepared from 2-butyl-2-ethylpropyl diol, a polycarbonate moiety prepared from a mixture of 1,5-pentanediol and 1,6-hexanediol.

22. The composition of claim 1, wherein the polyurethane has an acid number of at least about 25.

23. The composition of claim 1, wherein the polyurethane has a weight average molecule weight of at least about 10,000 g/mol.

24. The composition of claim 1, wherein the polyurethane is from about 0.1% to about 15% of the total weight of the composition.

* * * * *